United States Patent

Lair

(10) Patent No.: US 9,549,431 B2
(45) Date of Patent: Jan. 17, 2017

(54) MOBILE RADIO COMMUNICATIONS SIGNALING

(71) Applicant: Yannick Lair, Berkshire (GB)

(72) Inventor: Yannick Lair, Berkshire (GB)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/747,759

(22) Filed: Jun. 23, 2015

(65) Prior Publication Data

US 2015/0289313 A1    Oct. 8, 2015

Related U.S. Application Data

(63) Continuation of application No. 13/977,767, filed as application No. PCT/JP2011/079113 on Dec. 9, 2011, now Pat. No. 9,094,936.

(30) Foreign Application Priority Data

Jan. 14, 2011   (GB) .................................. 1100612.9

(51) Int. Cl.
    *H04W 4/00*       (2009.01)
    *H04W 76/04*      (2009.01)
    (Continued)

(52) U.S. Cl.
    CPC ............. *H04W 76/045* (2013.01); *H04W 8/22* (2013.01); *H04W 64/003* (2013.01);
    (Continued)

(58) Field of Classification Search
    CPC ...... H04W 76/045; H04W 8/22; H04W 64/00; H04W 76/02; H04W 76/04; H04W 88/02; H04W 76/00; H04W 64/003; H04W 72/0406
    See application file for complete search history.

(56) References Cited

U.S. PATENT DOCUMENTS

2007/0224990 A1   9/2007   Edge et al.
2007/0232306 A1   10/2007  Johannesson et al.
(Continued)

FOREIGN PATENT DOCUMENTS

EP   2 315 373 A2    4/2011
WO   01/22764 A1    3/2001
(Continued)

OTHER PUBLICATIONS

3GPP TS 24.007 V9.0.0 (Dec. 2009), 3GPP Technical Specification Group Core Network and Terminals; Mobile radio interface signalling layer 3; General aspects (Release 9), 149 pgs.
(Continued)

*Primary Examiner* — Ajit Patel
(74) *Attorney, Agent, or Firm* — Sughrue Mion, PLLC

(57) ABSTRACT

The present invention provides for a mobile radio communications device operative to signal a non-access stratum message to a mobile radio communications network device, for establishing and/or maintaining network connection, the device being arranged to include within the message a flag indicating the availability of extended NAS messaging found within an additional message separate from, but forming an extension to the non-access stratum message, and also for a signaling structure to be employed by such a device and a network device for exchanging signaling therewith and of course to related methods of such devices.

10 Claims, 8 Drawing Sheets

(51) Int. Cl.
  *H04W 8/22*   (2009.01)
  *H04W 76/02*  (2009.01)
  *H04W 76/00*  (2009.01)
  *H04W 72/04*  (2009.01)
  *H04W 64/00*  (2009.01)
  *H04W 88/02*  (2009.01)

(52) U.S. Cl.
  CPC ....... *H04W 72/0406* (2013.01); *H04W 76/00* (2013.01); *H04W 76/02* (2013.01); *H04W 64/00* (2013.01); *H04W 76/04* (2013.01); *H04W 88/02* (2013.01)

(56) References Cited

U.S. PATENT DOCUMENTS

| | | | |
|---|---|---|---|
| 2009/0257418 A1* | 10/2009 | Allen | H04M 7/123 370/338 |
| 2010/0065940 A1 | 3/2010 | Kim et al. | |
| 2010/0099439 A1* | 4/2010 | Aghili | H04W 4/02 455/458 |
| 2010/0182971 A1 | 7/2010 | Chin | |
| 2011/0002267 A1 | 1/2011 | Dwyer et al. | |
| 2011/0002268 A1 | 1/2011 | Dwyer et al. | |
| 2011/0002327 A1 | 1/2011 | Dwyer et al. | |
| 2011/0086656 A1* | 4/2011 | Zhou | H04W 8/24 455/507 |
| 2012/0302196 A1* | 11/2012 | Chin | H04L 65/1073 455/404.1 |

FOREIGN PATENT DOCUMENTS

| | | |
|---|---|---|
| WO | 2007/109695 A1 | 9/2007 |
| WO | 2010/033398 A1 | 3/2010 |

OTHER PUBLICATIONS

3GPP TS 24.008 V10.1.0 (Dec. 2010), 3GPP Technical Specification Group Core Network Terminals; Mobile radio interface Layer 3 specification; Core network protocols; Stage 3 (Release 10), 625 pgs.

3GPP TS 24.008 V8.12.0 (Dec. 2010), 3GPP; Technical Specification Group Core Network and Terminals; Mobile radio interface Layer 3 specification; Core network protocols; Stage 3 (Release 8), 592 pgs.

3GPP TS 24.008 V9.5.0 (Dec. 2010), 3GPP, Technical Specification Group Core Network Terminals; Mobile radio interface Layer 3 specification; Core network protocols; Stage 3 (Release 9), 614 pgs.

3GPP TS 44.005 V9.0.0 (Dec. 2009), 3GPP Technical Specification Group GSM EDGE Radio Access Network; Data Link (DL) layer; General aspects (Release 1), 19 pgs.

3GPP TS 44.006 V9.1.0 (Mar. 2010), 3GPP Technical Specification Groupe GSM/EDGE Radio Access Network; Mobile Station—Base Station System (MS-BSS) interface; Data Link (DL) layer specification (Release 9), 59 pgs.

International Search Report for PCT/JP2011/079113 dated Feb. 7, 2012.

Search Report for GB 1100612.9 dated May 16, 2011.

Written Opinion for PCT/JP2011/079113 dated Feb. 7, 2012.

* cited by examiner

MOBILE RADIO COMMUNICATIONS SIGNALING

CROSS-REFERENCE TO RELATED APPLICATIONS

This application is a continuation of U.S. patent application Ser. No. 13/977,767, filed Jul. 1, 2013, which is a 371 of International Application No. PCT/JP2011/079113, filed Dec. 9, 2011, which claims priority from United Kingdom Patent Application No. 1100612.9, filed Jan. 14, 2011, the disclosures of which are incorporated herein by reference in their entireties.

TECHNICAL FIELD

The present invention relates to mobile radio communications signaling and, in particular, to a mobile radio communications device User Equipment (UE), and a mobile radio communications network device arranged to transmit and receive signaling for the establishment/maintenance of network connections and to a particular signaling structure to be employed by such devices.

BACKGROUND ART

As mobile radio communications network technology continues to evolve, a large number of network users employ equipment operating in accordance with Second Generation (2G) specifications in addition, or alternatively, to Third Generation (3G) UMTS specifications. GSM specifications have offered stable functionality, in particular for the Circuit Switched (CS) domain, for many years.

However, with the ongoing development and system evolutions noted above and in accordance with the Third Generation Partnership Protocol (3GPP), for example, for Evolved Packet System (EPS), it has been found that some modifications have become necessary even within the CS domain. In particular, it has become necessary to introduce further information into, for example, initial Non-Access Stratum (NAS) messages such as those arising as part of a location updating procedure, for example the so-called LOCATION UPDATING REQUEST message.

As noted in 3GPP TS 24.008, Release-9 requires the addition of a Circuit Switched fallback Mobile Terminated call (CSMT) flag to be added to the LOCATION UPDATING REQUEST message whereas, in Release-10, a Circuit Switched fallback Mobile Originated call (CSMO) flag was also added.

Thus, it has been found that, for example, the LOCATION UPDATING REQUEST message has been identified as an appropriate host for an ever increasing amount of information and such requirement is likely to continue into the future.

However, a particular issue arises when considering 2G/GSM operation in that the initial NAS messages sent by the UE, such as the LOCATION UPDATING REQUEST message sent when establishing a dedicated connection with the network, exhibits a limitation of size of the message of twenty octets.

This limitation arises from the maximum number of octets in the information field of an Unnumbered Information-Frame (UI-Frame) when sent on the Standalone Dedicated Control Channel SDCCH.

This is clearly evidenced in the following excerpt from 3GPP TS 44.006,

"8.8.3 Maximum number of octets in an I, UI, SABM and UA frame partially or entirely available for the information field (N201)

The maximum number of octets partially or entirely available for the information field (N201) is:
   for frames of format A and B:
      for the SACCH: N201=18;
      for the FACCH and SDCCH: N201=20,
   for frames of format Bbis:
      for BCCH, AGCH, NCH and PCH: N201=23;
   for frames of format Bter:
      for the SACCH: N201=21;
      for the FACCH and SDCCH: N201=23;
   for frames of format B4:
      for the SACCH: N201=19."

As noted above, the LOCATION UPDATING REQUEST message is one such message which exhibits a limitation in length which, at present, is as noted in the above-mentioned Technical Specification is twenty octets. The LOCATION UPDATING REQUEST message has to remain compliant with this maximum length since, as noted in 3GPP TS 44.005, "for unacknowledged operation the data link layer does not offer segmentation services".

In further detail, and with reference to the 3GPP TS 24.008 sub clause 9.2.15, in Release-8 only two octets are available for extending the LOCATION UPDATING REQUEST message and when employing the IMSI mobile entity. However, and as noted from the above mentioned references to Releases 9 and 10, these two available octets have already found use. While in Release-9, only one octet remained available for extending the LOCATION UPDATING REQUEST, in Release-10, both the spare octets were employed, and no more octets remain available for further extending the content of the LOCATION UPDATING REQUEST message.

While proposals have been made to optimize the usage of any remaining bits within the LOCATION UPDATING REQUEST message, the actual size of the message nevertheless remains a limiting factor.

DISCLOSURE OF INVENTION

The present invention seeks to provide from a NAS signaling structure offering advantages over known such structures and, in particular, to a mobile radio communications device, and a mobile radio communications network device arranged to operate with such signaling in a manner exhibiting advantages over known devices and to related methods of operating.

According to a first aspect of the present invention, there is provided a mobile radio communications device operative to signal a non-access stratum message to a mobile radio communications network device, for establishing and/or maintaining network connection, the device being arranged to include within the message a flag indicating the availability of extended NAS messaging found within an additional message separate from, but forming an extension to the non-access stratum message.

Advantageously, through the use of the flag, any future information to be added to the non-access stratum message can actually be provided in a new/separate message.

This message can mirror the regular standard Layer 3 message configuration and content such as defined in 3GPP TS 24.007.

Since the length of the non-access stratum message is generally limited, particularly for GSM connectivity, the present invention can advantageously allow extension of the functionality of an initial non-access stratum message, without actually requiring an increase in length of the initial message.

Preferably the non-access stratum message of all aspects of the present invention can comprise part of a location updating procedure.

In one form, the non-access stratum message can comprise an octet structure and which structure can be of limited length.

In one particular embodiment of all aspects of the invention, the flag can comprise a bit in one of the octets and also the non-access stratum message can comprise a LOCATION UPDATE REQUEST message.

As will be appreciated the invention finds particular use in a device arranged for signaling in a GSM network. Then it can be arranged such that the flag is only used in GSM, i.e., in UMTS the flag bit will always be set to 0, and the device will just decode the initial NAS message in a regular way.

Of course, the device can be arranged also for signaling in a GSM or UMTS network and wherein the flag can serve to indicate the availability of extended NAS messaging found within an additional message separate to the initial NAS message.

According to another aspect of the invention, there is provided a mobile radio communications network device operative to receive a non-access stratum message from a mobile radio communications device, for establishing and/or maintaining connection with the network, the network device being arranged to identify within the message a flag indicating the availability of extended NAS messaging found within an additional message separate to, but forming an extension of, the non-access stratum message, and to await receipt of the additional message for receipt of the extended messaging.

In one example, the network device can be arranged to send a prompt for the additional message, which prompt can take the form of a request message.

The network device, which can comprise a MSC, can be arranged to delay identification and/or authentication phases until after receipt of the additional message.

Within various embodiments of the invention, the flag can serve to indicate that an extended messaging exchange is required.

According to yet another aspect of the present invention there is provided a non-access stratum message structure including a flag serving to indicate the availability of extended NAS messaging found within an additional message separate from, but forming and extension to, the non-access stratum message.

Of course this aspect of the invention can include any one or more of the various further features outlined above in relation to the earlier aspects of the invention.

According to still another aspect of the invention there is provided a method of signaling, from a mobile radio communications device, a non-access stratum message to a mobile radio communications network device, for establishing and/or maintaining network connection, the method including the step of providing within the message a flag indicating the availability of extended NAS messaging found within an additional message separate to the non-access stratum message and to allow for signaling of the extended messaging.

Of course, the method can involve non-access stratum messages comprising part of a location updating procedure.

According to a further aspect of the present invention there is provided a method of receiving, at a mobile radio communications network device, a non-access stratum message from a mobile radio communications device, for establishing and/or maintaining connection with the network, the method including identifying within the message a flag indicating the availability of extended NAS messaging found within an additional message separate to the non-access stratum message, and further awaiting receipt of the additional message for receipt of the extended messaging.

The method can further include the step of sending a prompt from the network device for the additional message, and the method can then also include the step of the mobile radio communications device responding at the network communications device to the prompt by sending the additional message.

The additional, but separate, message can then comprise a so-called EXTENDED LOCATION UPDATING message or, if prompting is involved, an EXTENDED LOCATION UPDATING RESPONSE.

Again, these further aspects of the invention can also include the further features discussed above in relation to the earlier aspects.

As will therefore be appreciated, by way of the present invention, the LOCATION UPDATING REQUEST message can effectively be extended by use of the additional EXTENDED LOCATION UPDATING message once the 20 octet limited is reached and, advantageously, no change to the general configuration of the LOCATION UPDATING REQUEST message is required and its length remains at 20 octets or less. Any required protocol enhancements to the LOCATING UPDATE REQUEST message can therefore readily be accommodated by way of the EXTENDED LOCATION UPDATING message as noted above, or the EXTENDED LOCATION UPDATING RESPONSE message also discussed above in the alternative.

Although it is appreciated that such additional messages will lead to an increase in the overall time required for the signaling procedure, it is envisaged that such a delay and additional signaling will not prove problematic. This holds particularly if the EXTENDED LOCATION UPDATING messages are used for machine type communication information exchanges. Also, if, at some stage in the future, further device properties are defined, it is considered more appropriate not to use a Type Value Format for the information element but rather a Type-Length Value format. Although this latter format is identified as by far the more appropriate, it disadvantageously cannot be accommodated within the message such as the LOCATION UPDATING REQUEST message due to the size limitations discussed above. Use of the extended messages discussed herein therefore advantageously allows for the definition of further device properties that might be required in the future.

BRIEF DESCRIPTION OF THE DRAWINGS

Embodiments of the invention are described further hereinafter, by way of example only, with reference to the accompanying drawings in which.

EMBODIMENTS FOR CARRYING OUT THE INVENTION

Figure 1:
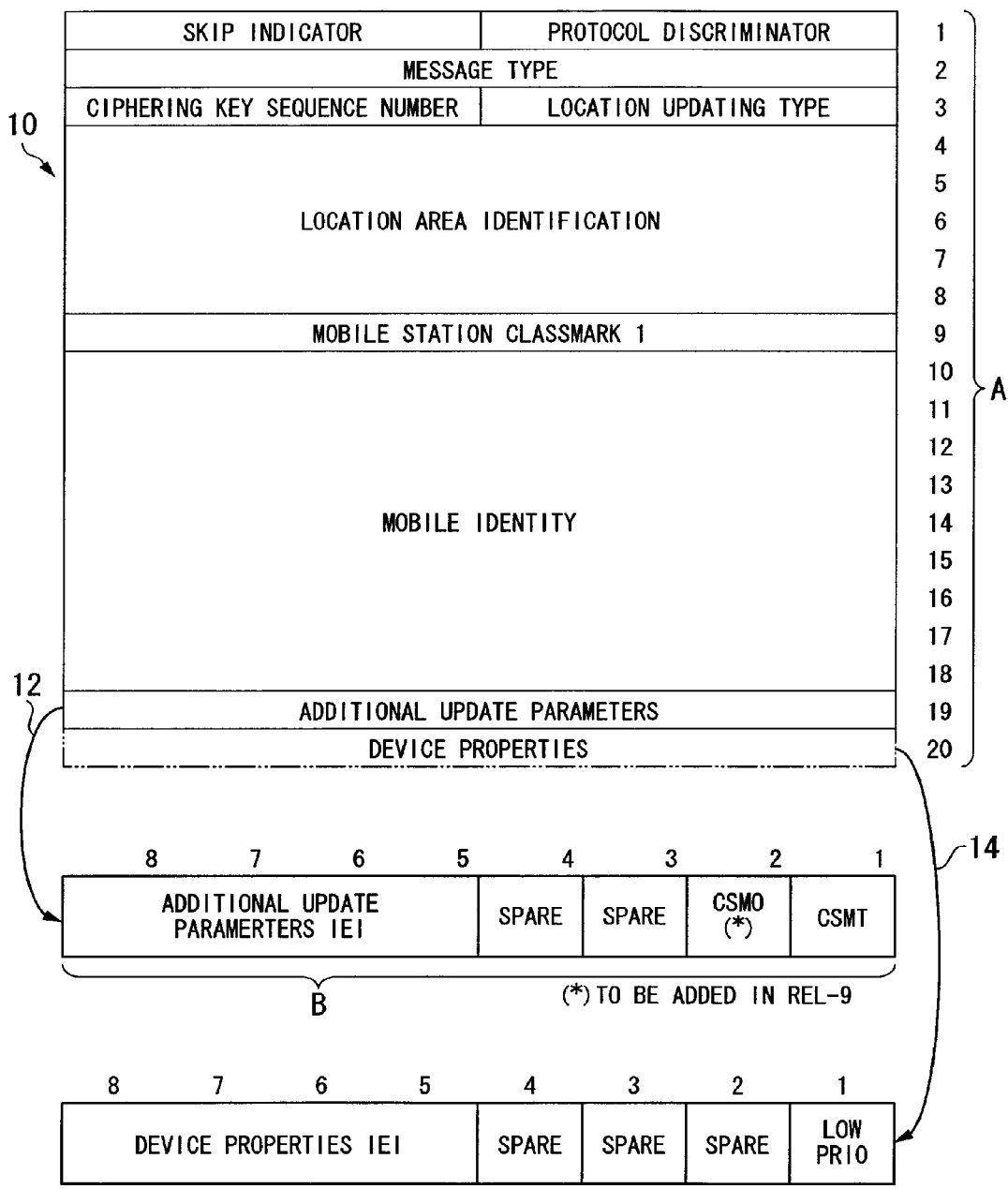
FIG. 1 is an illustration of the content of a current LOCATION UPDATING REQUEST message.

Turning now to FIG. 1, there is illustrated a current configuration of a LOCATION UPDATING REQUEST message 10 having a maximum length of twenty octets A and wherein the allocation of each of the eight bits of the 19th and 20th octets, noted as containing the additional update parameters 12 and the device properties 14 octets as mentioned later, is also illustrated in enlarged form.

As will be appreciated from the full bit details of the 19th octet 12, this octet has been employed by CSMT and CSMO flags in the first and second bit positions and this serves to limit any further extension of the LOCATION UPDATING REQUEST to the 20th octet 14 or to bit 3 or 4 from the 19th octet.

However, as discussed above, this single available octet can only serve minimal practical purpose in allowing for extension of the LOCATION UPDATING REQUEST message. In accordance with 3GPP TS 24.008 Release 10, even this last available octet is employed by an additional "device properties" information element as illustrated so that no octets are in fact then available for extension of the LOCATION UPDATING REQUEST message.

Figure 2:
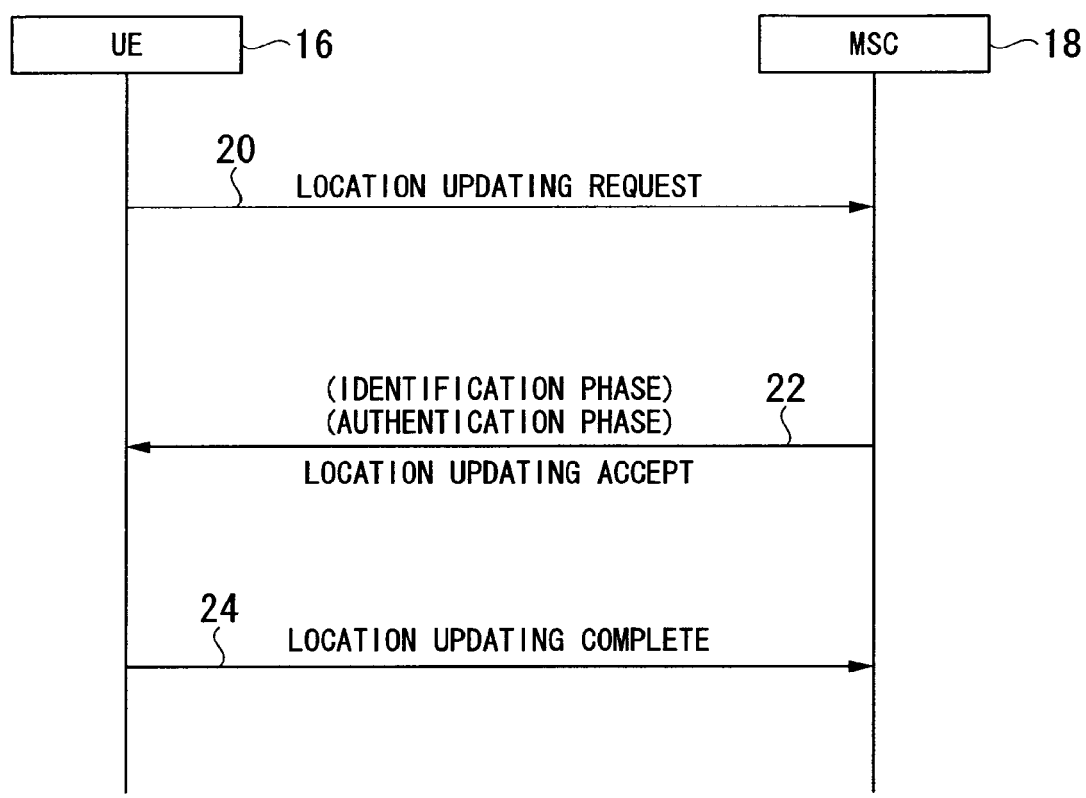
FIG. 2 illustrates NAS signaling arising during a location updating procedure.

With regard to FIG. 2, there is provided clarification of a location updating sequence arising in accordance with, for example, 3GPP TS 24.008 between the mobile radio communications device such as a UE terminal 16 and a mobile radio communications network device such as a Mobile Switching Centre (MSC) 18.

As illustrated, the procedure commences with a LOCATION UPDATING REQUEST 20 sent from the UE 16 to the MSC 18 and which, after an identification and authentication phase, leads to a LOCATION UPDATING ACCEPT message 22 being returned from the MSC 18 to the UE 16 prior to a message 24 from the UE 16 confirming completion of the location updating procedure.

As will be appreciated from the following, the present invention provides enhancement to the signaling arising during a location updating sequence as initially illustrated by reference to FIGS. 1 and 2. Accordingly, and turning now to FIG. 3, there is provided an illustration of a LOCATION UPDATING REQUEST message 26 having a structure defined by content arising in accordance with an embodiment of the present invention.

Again, and assuming use within GSM network, the LOCATION UPDATING REQUEST message 26 has a maximum length of twenty octets and in which the 19th octet 28 employing additional update parameters can also, in accordance with Release 9 as mentioned above employ CSMT and CSMO flags as required.

Figure 3:
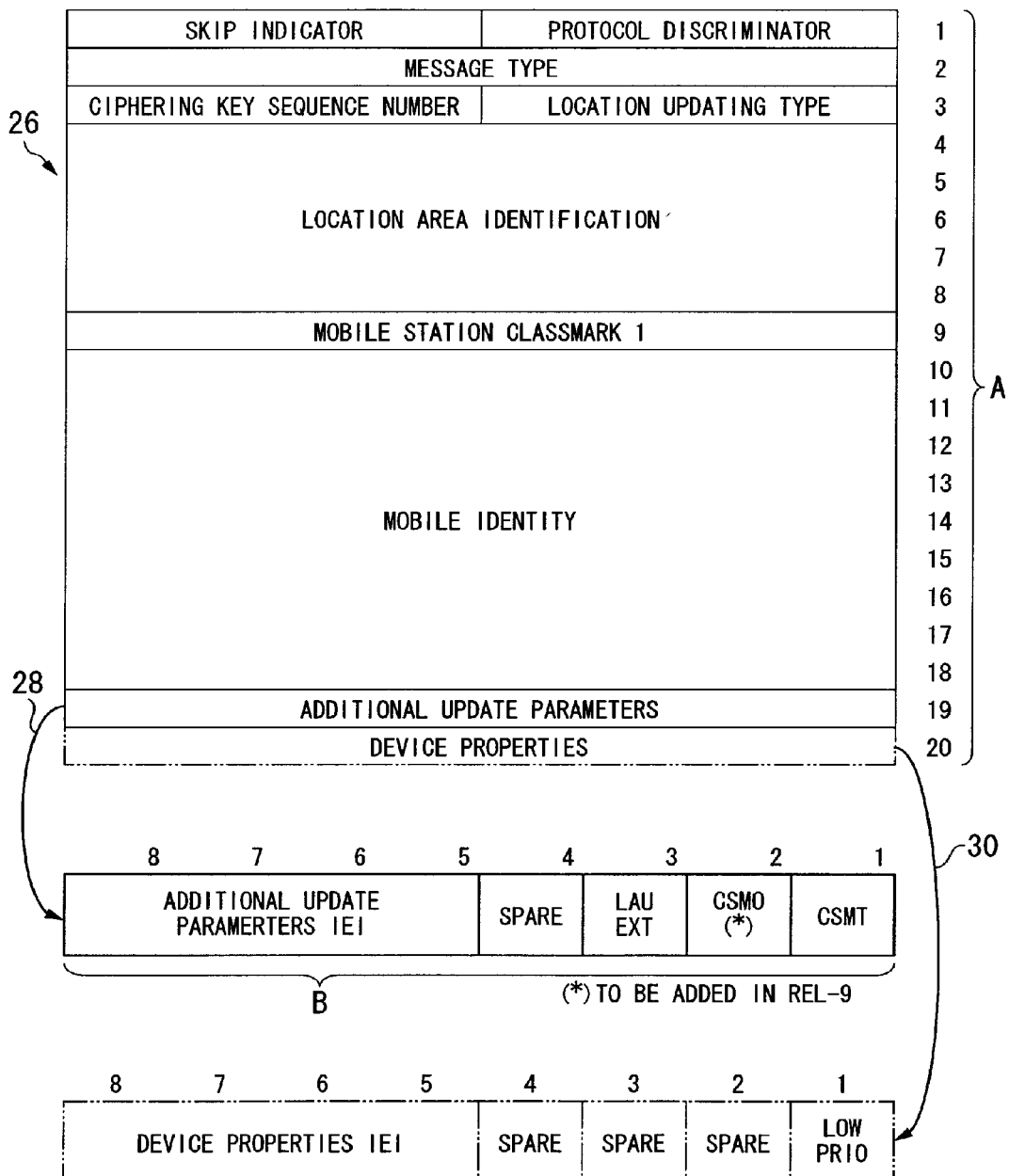
FIG. 3 illustrates a LOCATION UPDATING REQUEST message according to one embodiment of the present invention.

However, for both the 19th octet 28 and the 20th octet 30 illustrated in FIG. 3, the present invention appreciates that there are still spare bits located within those octets and the present invention advantageously employs such spare bits for the purpose of effectively extending the LOCATION UPDATING REQUEST message.

Turning to the further details of octet 28 within FIG. 3, the 8-bit length is illustrated by way of numbered bits and it can be seen that the CSMT and CSMO flags are located at the first and second bit positions. This still leaves the third and fourth bit positions spare, as indeed are bit positions 2, 3 and 4 of the 20th octet 30 in accordance with the above-mentioned Release 10.

In accordance with this illustrated embodiment of the present invention, a new functional bit LAU EXT is introduced into the third bit position of the 19th octet 28 of the LOCATION UPDATING REQUEST message 26 although, of course, any other of the spare bits discussed above for the 19th and 20th octets could equally be employed.

The new LAU EXT bit illustrated at a third bit position of octet 28 serves as a flag indicating that an extended LOCATION UPDATING message exchange is required with the network.

Figure 4:
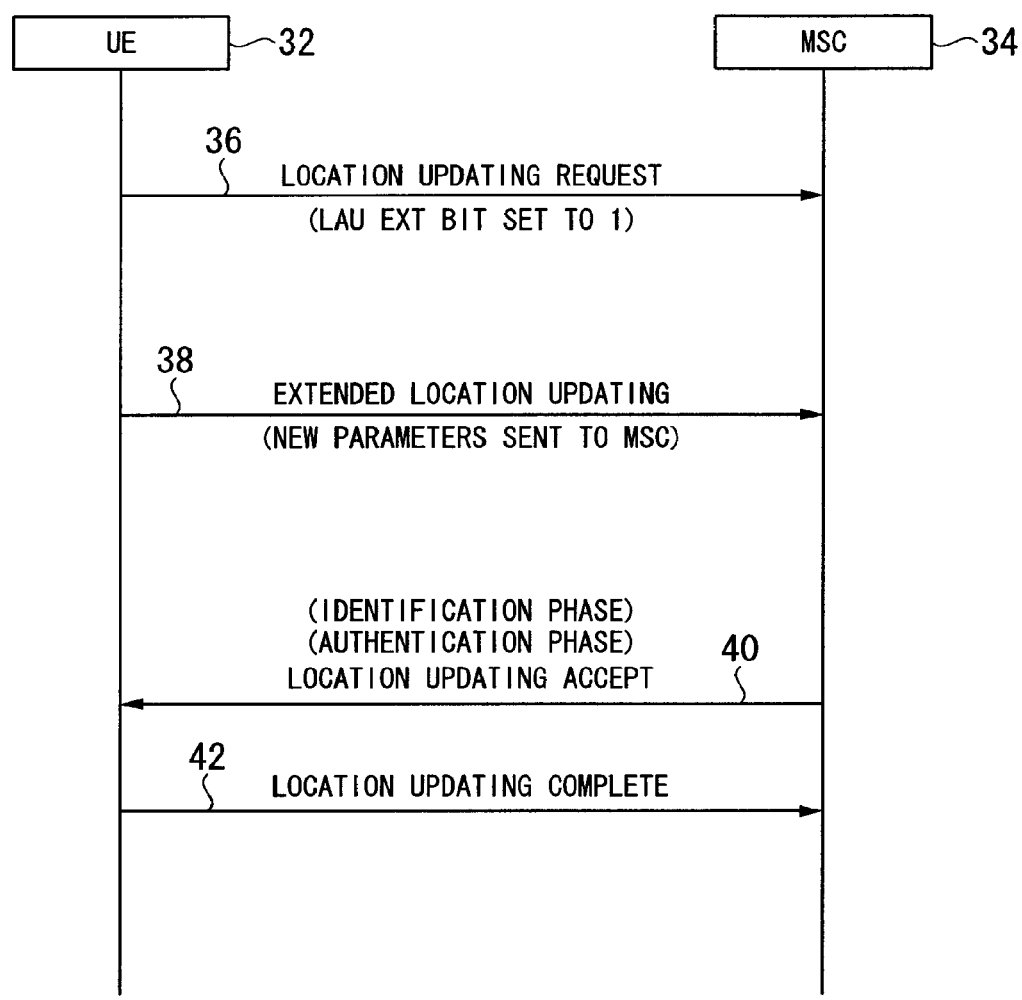
FIG. 4 illustrates NAS signaling arising in accordance with one embodiment of the present invention.
Figure 5:
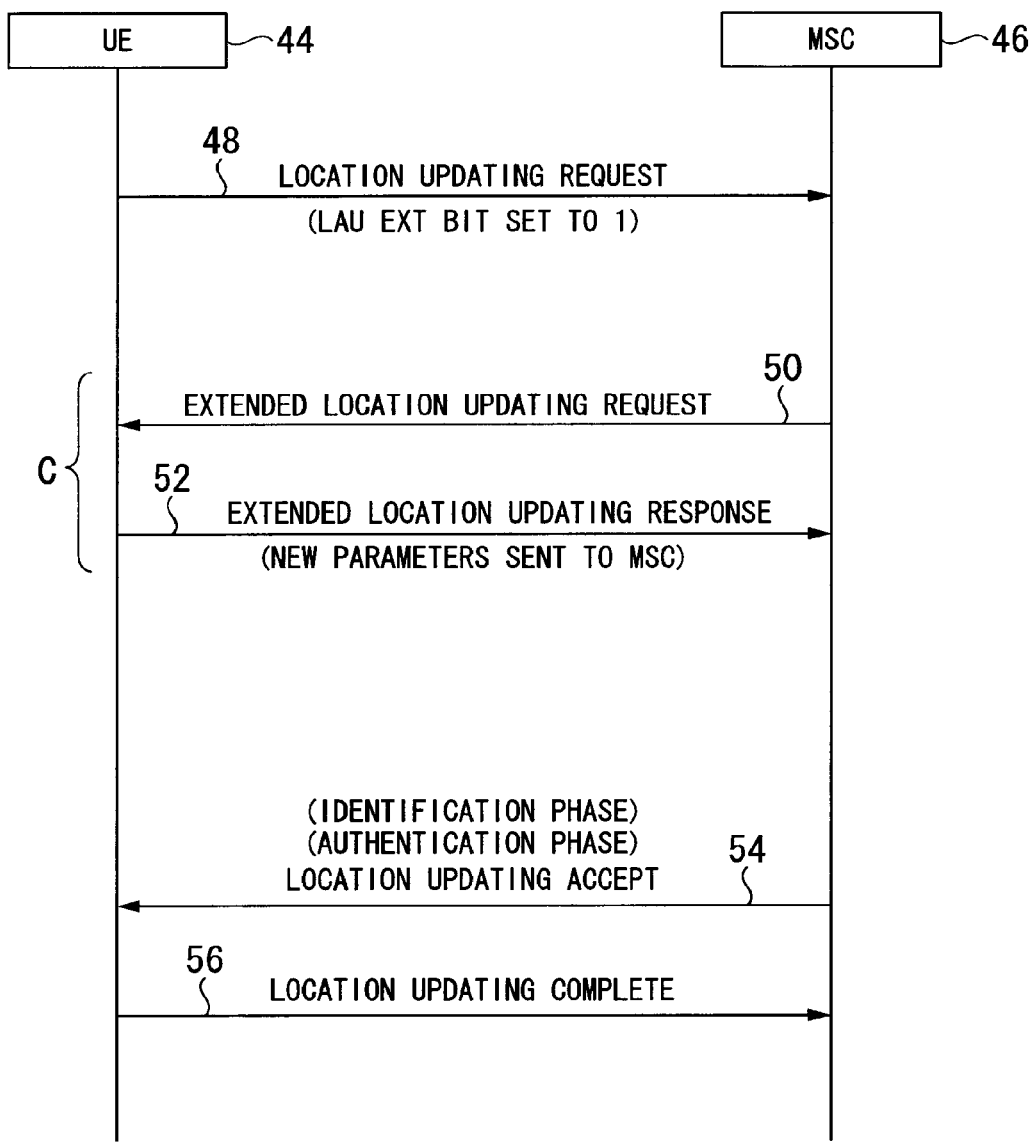
FIG. 5 illustrates the NAS signaling arising in accordance with another embodiment of the present invention.

The potential signaling arising between the UE and the MSC in one particular embodiment of the present invention and which takes account of the new LAU EXT bit is illustrated further with reference to FIGS. 4 and 5.

FIG. 4 is an illustration of signaling arising in accordance with a first embodiment of the present invention and between UE 32 and MSC 34.

The signaling again commences with a LOCATION UPDATING REQUEST signal 36 and wherein the LAU EXT bit illustrated in FIG. 3 is set to "1".

Figure 7:
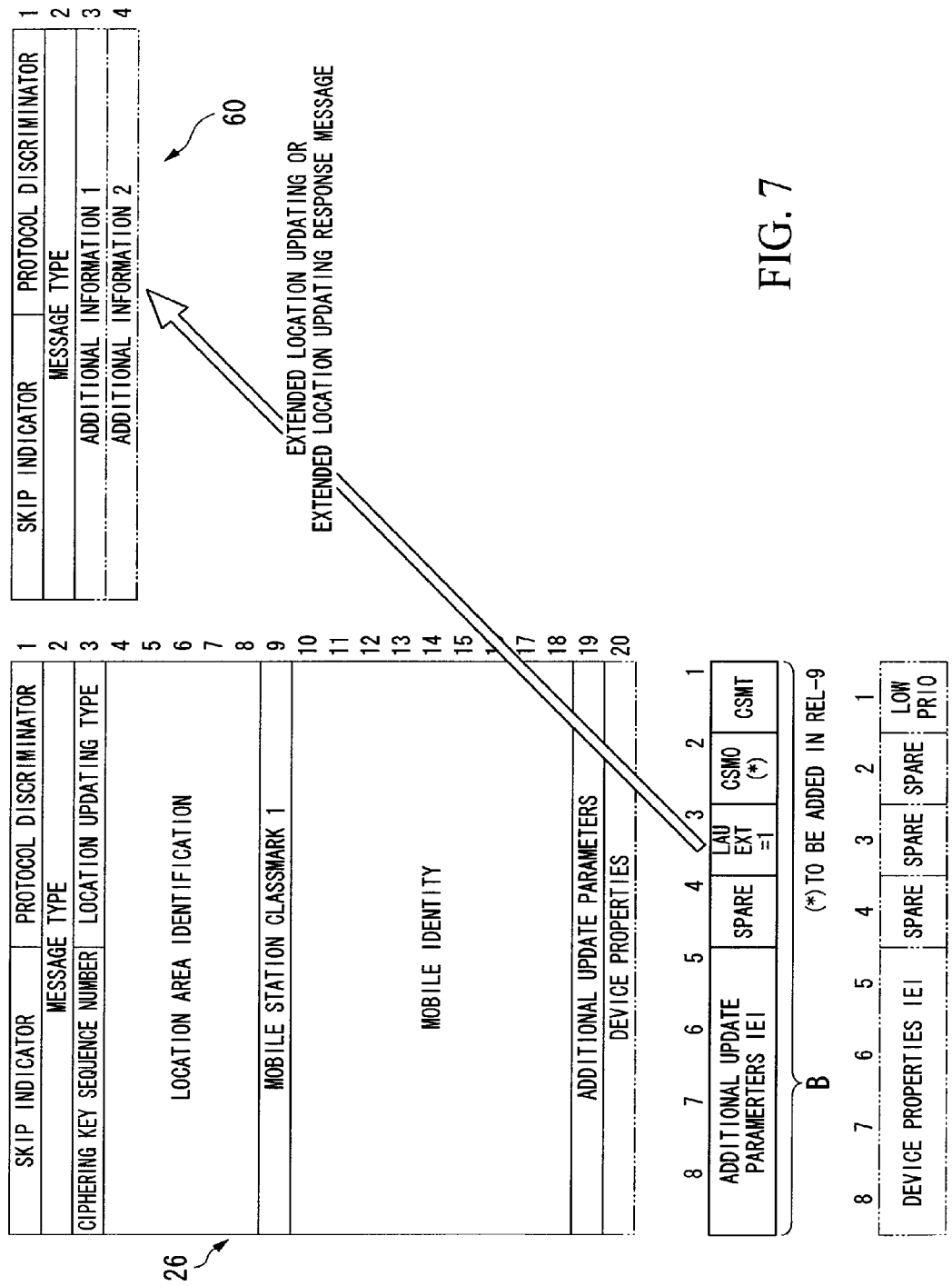
FIG. 7 illustrates messaging structure according to an embodiment of the present invention.

In this manner, the UE 32 indicates that it has to send additional LOCATION UPDATING REQUEST information to the MSC 34 and the MSC 34 can be arranged to delay the identification and authentications phases whilst waiting for the additional information carried by the separate EXTENDED LOCATION UPDATING message (illustrated in FIG. 7).

The EXTENDED LOCATION UPDATING message 38 is then sent by the UE 32 and which can contain relevant new parameters sent to the MSC 34. Of course, if for some reason the MSC 34 is not able to implement the present invention, the EXTENDED LOCATION UPDATING message could simply be ignored, or the MSC 34 can be arranged to send a STATUS message back to the UE 32.

Subsequently, and after the identification and authentication phases, the LOCATION UPDATING ACCEPT 40 and LOCATION UPDATING COMPLETE 42 signaling exchanges between the UE 32 and the MSC 34 complete the location update procedure as illustrated.

In accordance with this first embodiment, it should be appreciated that the MSC 34 is simply arranged to wait for the additional information which the UE 32 sends in the separate additional EXTENDED LOCATION UPDATING message.

This particular embodiment can prove favorable insofar as it employs minimal additional signaling although another embodiment is now discussed in relation to FIG. 5. The signaling relating to this embodiment is illustrated in relation to a UE 44 and MSC 46 and, again commences with a LOCATION UPDATING REQUEST message 48 sent from the UE 44 to the MSC 46 and again in which the LAU EXT bit has been set to "1". Again, the flag represented by the LAU EXT bit indicates that there is additional information to be sent to the MSC 46.

However, in this further embodiment, an additional signaling exchange C arises in which the MSC 46 sends a specific EXTENDED LOCATION UPDATING REQUEST message 50 to the UE 44 specifically requesting this additional information rather than simply awaiting its arrival as was the case with the embodiment of FIG. 4.

In response to the request 50, the UE 44 replies with the new/additional EXTENDED LOCATION UPDATING message comprising an EXTENDED LOCATION UPDATING RESPONSE 52 and containing the required new parameters to be sent to the MSC 46.

Then, subsequent to the identification and authentication phase, the LOCATION UPDATING ACCEPT 54 and the LOCATION UPDATING COMPLETE 56 signaling exchanges again conclude the procedure as before.

As will therefore be appreciated, in this second embodiment of the present invention, when receiving the LOCATION UPDATING REQUEST message with the new LAU EXT bit, the MSC 46 is arranged to send a specific EXTENDED LOCATION UPDATING REQUEST message to the UE 44 specifically prompting the UE 44 to deliver the new/additional EXTENDED LOCATION UPDATING message.

Figure 6:
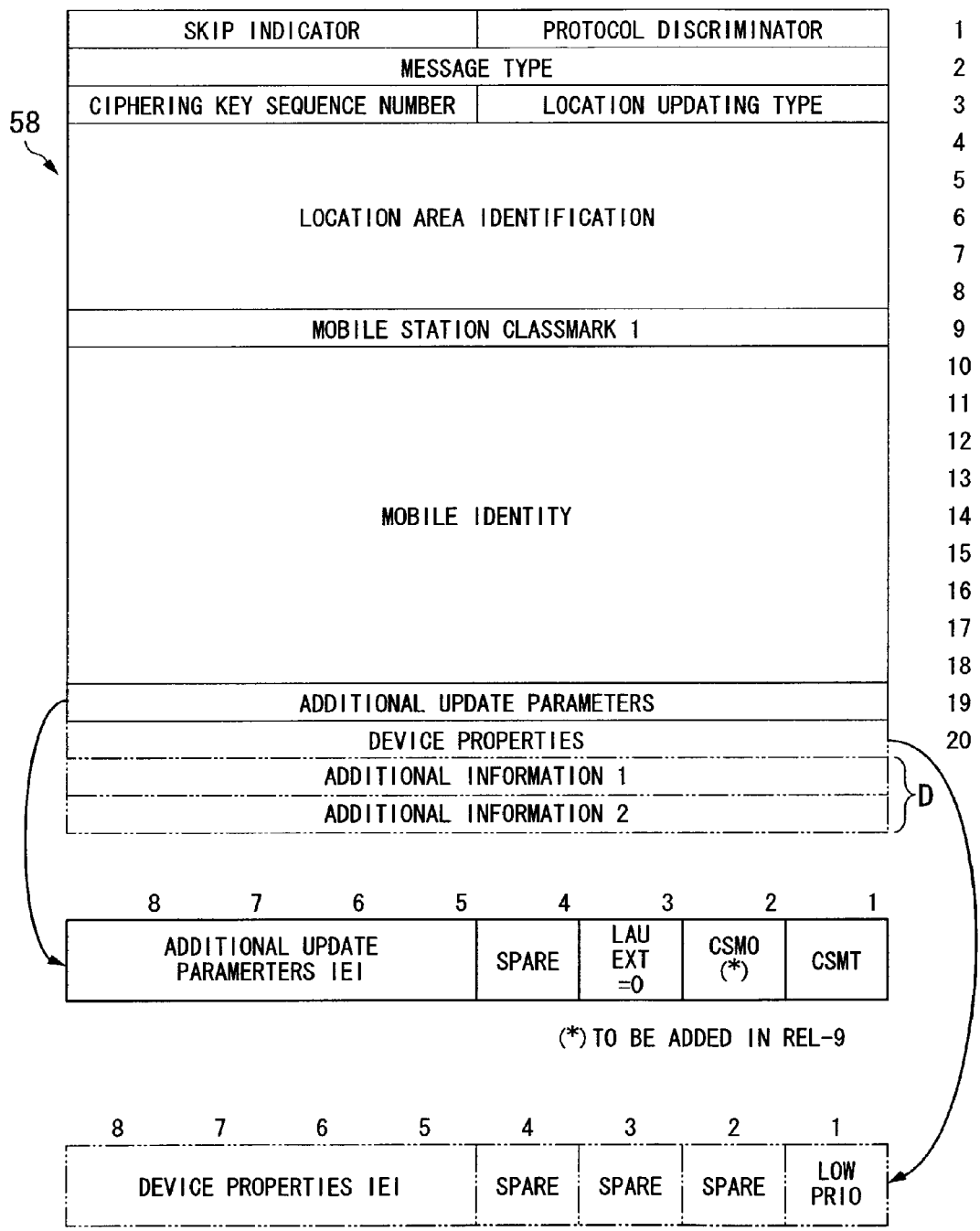
FIG. 6 illustrates the potential structure of the LOCATION UPDATING REQUEST message that can be employed by a device embodying the present invention within a UMTS environment.

While the present invention is directed particularly to the GSM environment, a similar LOCATION UPDATING REQUEST message content could be used in UMTS insofar as the flag represented by LAU EXT can serve to indicate the presence of additional information elements such as the Additional Elements D illustrated in FIG. 6.

Turning therefore to FIG. 6 in greater detail, there is illustrated a LOCATION UPDATING REQUEST message 58 in which the LAU EXT bit is again employed as a flag. In this example, the flag is set to "0" so as to indicate the presence of the Additional Information elements D indicated as "Additional Information 1 and Additional Information 2".

However, when operating in GSM, and responsive to the limitation on the length of the LOCATION UPDATING REQUEST message, the LAU EXT bit is set to "1" as discussed above and which serves to indicate the presence of an EXTENDED LOCATING UPDATING message (with the first embodiment discussed above) or an EXTENDED LOCATION UPDATING RESPONSE message (in accordance with the second embodiment discussed above) 60 as illustrated in FIG. 7.

This separate new EXTENDED LOCATION UPDATING message (with the first embodiment discussed above) or EXTENDED LOCATION UPDATING RESPONSE message (in accordance with the second embodiment discussed above) 60 serves as an effective extension to the LOCATION UPDATING REQUEST message 26 of FIG. 3.

Figure 8:
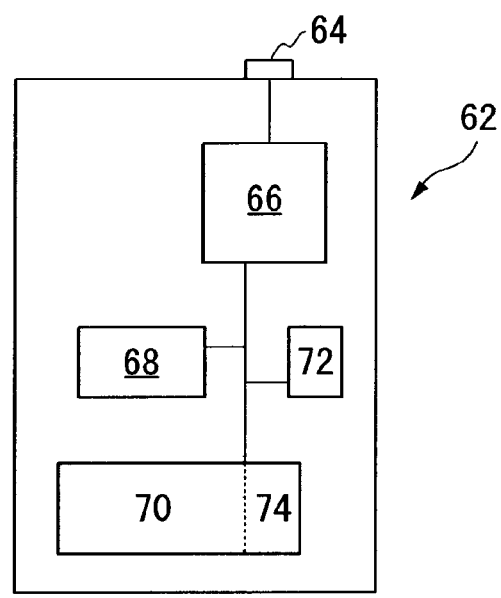
FIG. 8 is a schematic illustration of a mobile radio communications device according to an embodiment of the present invention.
Figure 9:
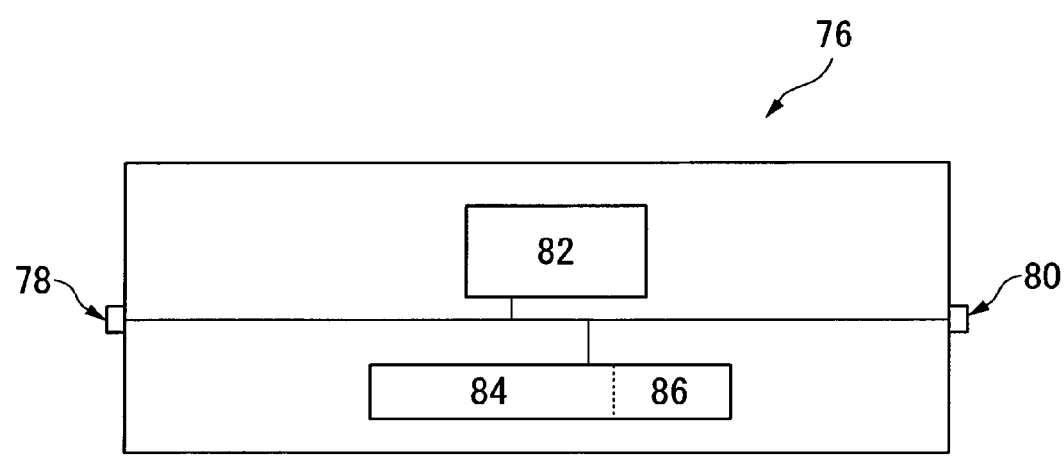
FIG. 9 is a schematic illustration of a mobile radio communications network device according to an embodiment of the present invention.

With reference to FIG. 8 there is provided a schematic illustration of a mobile radio communications device UE 62 in the form of a mobile phone handset and having a standard air interface comprising antenna 64 and reception/transmission 66 functionally connected within the handset to memory storage means 68, processing means 70 and user interface means 72.

Within the illustrated embodiment, the processor means 70 includes a LAU EXT bit setting function 74 which serves to set the bit to the appropriate value so as to flag the presence, or otherwise, of the separate EXTENDED LOCATION UPDATING messaging such as that 60 illustrated in FIG. 7, and which of course is arranged to be sent subsequently by the UE.

The present invention also provides for a network device such as MSC 76 arranged, for example, with an interface 78 to a Radio Network Controller and an interface 80 to a GSM network via a Base Station Controller (BSC), wherein the MSC 76 includes memory 82 and processing 84 functionality in which the processing functionality 84 can include means 86 for responding to receipt of a LOCATION UPDATING REQUEST message including a flag such as the LAU EXT flag discussed above. The MSC 76 can then return, in response to identification of the LAU EXT flag, by way of the interface 78 and the related Radio Network Controller and base station or by way of the interface 80 and the related Base Station Controller, an EXTENDED LOCATION UPDATING REQUEST message specifically inviting a UE such as that of FIG. 8 to send its EXTENDED LOCATION UPDATING RESPONSE message.

From the above it should be appreciated that the present invention can be embodied with any appropriate products supporting 2G/3G and CS services. Of course, insofar as the present invention allows for the sending of additional information from the UE to the MSC during a location updating procedure, it can readily prove possible to retain the remaining spare bits in the existing LOCATION UPDATING REQUEST message for use in relation to critical information necessary at the MSC level. The new EXTENDED LOCATION UPDATING message, or the EXTENDED LOCATION UPDATING RESPONSE according to the second embodiment, would then be employed for lesser or non-critical information, i.e. information which could be received by the MSC at a later stage during the location updating procedure, for example after the identification or authentication phase.

Of course, it should be appreciated that the present inventions is not restricted to the details of the forgoing description and can be employed, as appropriate, in relation to any NAS signaling message and, in particular, any signaling message employed as part of the location updating procedure.

Thus, the messages concerned could employ quite different identities from the EXTENDED LOCATION UPDATING and EXTENDED LOCATION UPDATING RESPONSE identities noted above and could even be mapped to other existing messages if required.

For example, the IDENTITY REQUEST message such as defined in 3GPP TS 24.008 could be employed by the MSC to request additional information of the UE and consequently serve the same purpose as the new EXTENDED LOCATION UPDATING REQUEST message discussed above. Also, the existing IDENTITY RESPONSE message as defined also in 3GPP TS 24.008 could be extended to carry the required additional information from the UE to the MSC so as to serve the same purpose as the so-called EXTENDED LOCATION UPDATING RESPONSE message discussed above.

As yet a further alternative, the identification and authentication phases could occur after the extended location updating exchange, and so, according to another arrangement, the MSC implementation may serve to request additional location updating information (via the EXTENDED LOCATION UPDATING REQUEST message) only after the identification and/or authentication phases.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

The invention claimed is:

1. A communications node which communicates with another communications node, the communication node comprising:
   a processor configured to generate a first message and a second message; and
   a transceiver configured to transmit the first message and the second message,
   wherein the first message comprises a first portion and a second portion,
   wherein the first portion of the first message comprises a plurality of parameters and the second portion of the first message comprises additional parameters and information which indicates, to the another communications node, that the second message is to be transmitted,
   wherein the first message is transmitted before the second message, and
   wherein the second message has a first portion that is smaller than the first portion of the first message, followed by a second portion comprising further additional parameters.

2. The communications node according to claim 1, wherein the communications node is a user equipment.

3. The communications node according to claim 1, wherein the first message is a location update request.

4. The communications node according to claim 1, wherein the second message is an extended location updating.

5. The communications node according to claim 1, wherein at least one of the first message and the second message is a Non-Access Stratum (NAS) message.

6. A method for communicating between a communications node and another communications node, the method comprising:
   generating a first message and a second message; and
   transmitting the first message and the second message,
   wherein the first message comprises a first portion and a second portion,
   wherein the first portion of the first message comprises a plurality of parameters and the second portion of the first message comprises additional parameters and information which indicates, to the another communications node, that the second message is to be transmitted,
   wherein the first message is transmitted before the second message, and
   wherein the second message has a first portion that is smaller than the first portion of the first message, followed by a second portion comprising further additional parameters.

7. The method of claim 6, wherein the communications node is a user equipment.

8. The method of claim 6, wherein the first message is a location update request.

9. The method of claim 6, wherein the second message is an extended location updating.

10. The method of claim 6, wherein at least one of the first message and the second message is a Non-Access Stratum (NAS) message.

* * * * *